United States Patent [19]

McElhannon

[11] 4,196,346

[45] Apr. 1, 1980

[54] LASER GUIDED BLIND LANDING SYSTEM FOR AIRCRAFT

[76] Inventor: Raymond J. McElhannon, c/o Cooper, Dunham, Clark, Griffin & Moran, 30 Rockefeller Plaza, New York, N.Y. 10020

[21] Appl. No.: 935,980

[22] Filed: Aug. 22, 1978

[51] Int. Cl.² ............................. H04B 9/00; G01S 1/18
[52] U.S. Cl. ..................................... 455/611; 340/25; 343/108 SM
[58] Field of Search ......................... 250/199; 340/25; 343/108 SM

[56] References Cited

U.S. PATENT DOCUMENTS

| | | | |
|---|---|---|---|
| 2,539,405 | 1/1951 | Deloraine | 343/108 SM |
| 3,523,664 | 8/1970 | Doniger | 343/108 SM |
| 3,784,968 | 1/1974 | Brosow | 340/25 |

*Primary Examiner*—Howard W. Britton
*Attorney, Agent, or Firm*—Raymond J. McElhannon

[57] ABSTRACT

A laser guided blind landing system for aircraft comprising in combination: a longitudinally extending runway, a plurality of laser beam generators mounted in longitudinally spaced alignment therewith at one end thereof, said generators being positioned to direct laser beams therefrom at progressively increasing coplanar inclinations away from said runway in progressive sequence from the nearest to the furthest therefrom, thereby to produce intersecting segments of said beams in pairs of each, of least slope adjacent said runway and of greatest slope remotest therefrom, the so intersecting laser beam segments thereby forming a continuous laser aircraft glide path of gradually decreasing slope from said segment remotest from said runway to that closest thereto. Preferably all of the laser generators radiate laser beams of distinctively different wavelengths or are tone modulated at different frequencies, except for the runway approach beam which may be of wavelength in the visible spectra.

5 Claims, 1 Drawing Figure

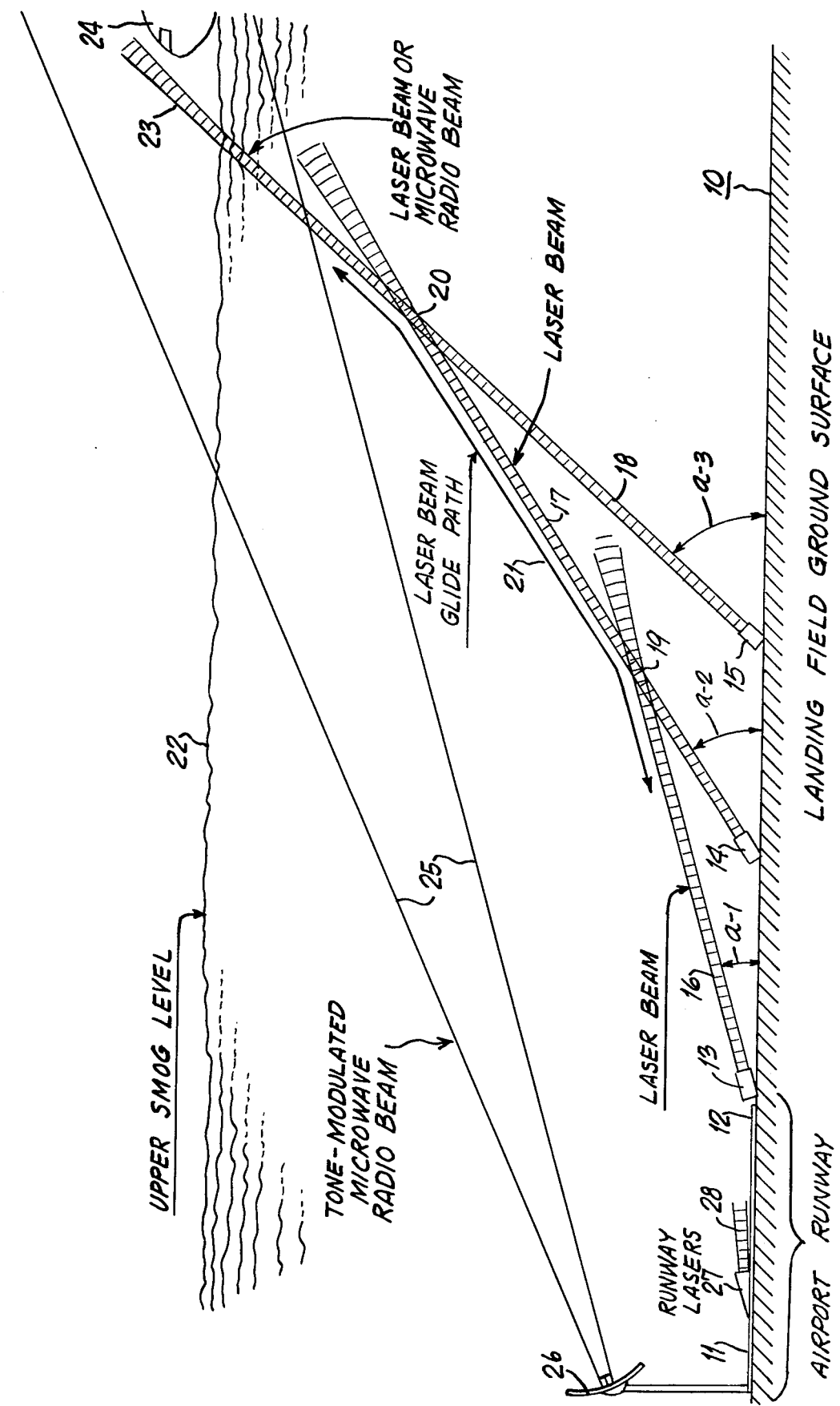

LASER GUIDED BLIND LANDING SYSTEM FOR AIRCRAFT

This invention pertains to aircraft blind landing systems and provides laser beam guided such systems adapted for guidance of an aircraft to a landing runway under adverse smoggy or cloudy weather conditions.

Insofar as I am aware, all aircraft blind landing systems now in commercial use employ microwave radio beams for guidance of aircraft through smog and overcast to a landing runway. As I understand the microwavelengths employed are in the order of about five to ten centimeters due primarily to the unavailability of electronic oscillators capable of generating appreciable power outputs of shorter wavelengths. According to my information the length of the shortest waves that can be generated by electronic means is about one millimeter or 10 million angstrom units. Any attempt to reach shorter wavelengths with conventional electronic designs meets with formidable difficulties. Foremost among these is the difficulty of fabricating resonant structures that tune the oscillators. These structures can seldom be larger than a wavelength in size. At millimeter wavelengths they are already so small that they are hard to make with uniform accuracy. Also such oscillators are incapable of generating appreciable outputs at wavelengths of less than about one centimeter and more practically of under five centimeters.

A further objection to such electronic oscillators is that they are incapable of generating and radiating microwaves which are monochromatic (i.e. of single frequency) and which are spatially coherent (i.e. a plane wave front in which all wave-fronts are plane surfaces). In consequence the radiated wave front diverges rapidly in space to the extent of about 10 degrees of arc with the most effective antenna radiators. Such oscillators and antenna systems are accordingly incapable of radiating a sharply focussed radio beam for plane guidance in smog, especially with increasing distance from the source.

Laser beam generators in contrast provide atomic and molecular resonators which radiate spatially coherent, monochromatic and hence highly directional transmissions in space, such as are unattainable by conventional radio techniques. A plane-wave laser source radiates a beam that is almost constant in width for a distance D equal to the diameter of the source squared divided by four times the wavelength of radiation, beyond which the beam gradually expands in the form of a cone.

In actuality the distance D of spatial coherence is about three-fifths of a mile for a beam of two-inches in diameter at a wavelength of some 6300 angstrom units, i.e. about 630 nanometers or 0.006 mm. The range of spatial coherence is of course increased proportionately to the square of its cross sectional area at the source and also in inverse ratio of its wavelength, being much greater for beams in the visible and infra red regions of about 500-700 angstrom or 100 to 1000 nanometers. The extent of spatial coherence of course applies only to transmission through a near vacuum or clear atmosphere and is considerably reduced by intervening smog or fog.

Laser sources are presently available for radiating spatially coherent and monochromatic beams over a wide range of frequency including the visual, infra red and ultra radio frequency spectra and such as to completely close the gap extending down to and including the microwave range of the presently available electronic oscillators.

It is accordingly a primary object of the invention to provide aircraft blind landing systems which are laser beam guided at least as applied to the final runway landing approach and which may be further laser guided as applied to approach and descent to the runway or which alternatively may be supplemented with microwave radio beam approach and descent guidance.

In accordance with one embodiment of the invention the blind landing apparatus and method thereof comprises, the combination with a longitudinally extending airport runway of a plurality of laser beam sources mounted in longitudinally spaced alignment therewith at one end thereof, said generators being positioned to direct laser beams therefrom at progressively increasing substantially coplanar inclinations away from said runway in progressive sequence from the nearest to the furthest such sources therefrom, thereby to produce intersecting segments of said beams in pairs of each, of least slope adjacent said runway and of greatest slope remotest therefrom, the so intersecting laser beam segments thereby forming a continuous laser aircraft glide path of gradually decreasing slope from said segments remotest from said runway to that closest thereto.

The laser sources will operate at distinctively different wavelengths for pilot differentiation as between the several glide path segments and corrective rate of descent from segment to segment. Alternatively distinctively different tone modulated lasers may be employed for all segments, or visual guidance may be employed for the final landing strip approach. Alternatively a tone modulated microwave radio beam may be employed for the initial location of and descent along the glide path.

The accompanying drawing illustrates a preferred embodiment of the invention, schematically and diagrammatically in elevation.

Referring thereto the airport ground surface 10, has formed thereon a runway landing strip 11, which extends longitudinally to the left for the usual extent of a mile or so. Mounted in longitudinally spaced alignment with the landing strip commencing the landing end thereof, is a sequence of three laser beam generators 13-15 inc. These generators are so positioned as to outputs, as to radiate laser beams, as at 16, 17 and 18 away from said landing strip and at progressively increasing coplanar angular inclinations to the horizontal and as at a-1, a-2 and a-3. Since the beams are coplanar they intersect in pairs, as at 19 and 20, to form a continuous segmented laser beam glide path which slopes decreasingly downward from the segment of the beam 18 of greatest slope via the segment of beam 17 of intermediate slope to the segment of beam 16 of least slope.

In the drawing the landing field is illustrated as being fogged or smogged in up to a height 22 above ground level 10. The beam 18 of greatest slope extends upwardly through this smog into the clear atmosphere above it, and as at 23 for detection by an incoming aircraft 24 and descent thence to landing along the glide path 21.

In order to facilitate precise detection by the pilot of the region of intersection 20 and 19 of the beams to correct the aircraft descent according to the changes of beam slope thereat, beams of different wavelengths may be employed, or alternatively beams of the same or different wavelengths may be tone modulated at different frequencies. The beams of longest penetration through the smog will be of wavelengths of about one centimeter or more and will be tone modulated. The landing approach beam A-1 may be visual or tone modulated.

In cases where heavy fog extends down to the runway 11, runway laser beam generators may be provided as at 27 for directing visual laser beams as at 28, to facilitate final landing of the incoming aircraft.

For precisely directing the aircraft 24 to the point of emergence 23 of laser beam 18 from the smog, the landing field may be equipped with a shortwave microwave radio transmitter for directing a tone modulated microwave radio beam 25 from an antenna 26 thereof as illustrated in the drawing.

The laser source 13-15 inc., may comprise solid ruby crystal flash lamp masers such as described in an article entitled "Optical Masers" by A. L. Schawlaw, appearing in the June 1961 issue of the Scientific American. For laser beam penetrations to greater smog heights, resort may be had to the gaseous lasers, such as the "High-Power Carbon Dioxide Lasers" described in an article of that title by C. K. Pantel appearing in the August 1968 issue of the Scientific American. As described therein these carbon dioxide lasers having low loss optical "windows" of between eight and fourteen microns are capable of transmission through the earth's atmosphere. Both of the aforesaid articles are incorporated by reference herein.

What I claim is:

1. A laser guided blind landing system for aircraft comprising in combination: a longitudinally extending runway, a plurality of laser beam generators mounted in longitudinally spaced alignment therewith at one end thereof, said generators being positioned to direct laser beams therefrom at progressively increasing coplanar inclinations away from said runway in progressive sequence from the nearest to the furthest therefrom, thereby to produce intersecting segments of said beams in pairs of each, of least slope adjacent said runway and of greatest slope remotest therefrom, the so intersecting laser beam segments thereby forming a continuous laser aircraft glide path of gradually decreasing slope from said segment remotest from said runway to that closest thereto.

2. A blind landing system according to claim 1, wherein all of said generators produce laser beams having distinctively different wavelengths.

3. A blind landing system according to claim 2, wherein said laser beam wavelengths progressively increase in the order of the nearest to the furthest from said landing strip.

4. A blind landing system according to claim 3, wherein the generator remotest from said runway radiates a laser beam of up to one centimeter and more and wherein the remaining said generators radiate laser beams of distinctively different shorter wavelengths.

5. A blind landing system according to claim 1, wherein said laser beams are tone modulated at distinctively different audio frequencies.

* * * * *